Aug. 27, 1957  O. L. BOOTHBY ET AL  2,804,415
PREPARATION OF MnBi BODIES
Filed Sept. 20, 1956  3 Sheets-Sheet 1

INVENTORS O. L. BOOTHBY
D. H. WENNY, JR.
BY
ATTORNEY

Aug. 27, 1957    O. L. BOOTHBY ET AL    2,804,415
PREPARATION OF MnBi BODIES
Filed Sept. 20, 1956               3 Sheets-Sheet 3

INVENTORS O. L. BOOTHBY
D. H. WENNY, JR.
BY
ATTORNEY

United States Patent Office 2,804,415
Patented Aug. 27, 1957

2,804,415

PREPARATION OF MnBi BODIES

Otis L. Boothby, Brooklyn, N. Y., and Daniel H. Wenny, Jr., West Orange, N. J., assignors to Bell Telephone Laboratories, Incorporated, New York, N. Y., a corporation of New York Application September 20, 1956, Serial No. 611,077

9 Claims. (Cl. 148—103)

This invention relates to processes for the preparation of alloys of manganese and bismuth, and relates particularly to processes for the preparation of the alloy corresponding to the chemical formula MnBi.

Alloys of manganese and bismuth have long been known to exhibit ferromagnetic properties. In particular, the manganese-bismuth alloy containing manganese and bismuth in such a ratio by weight as corresponds approximately with the ratio of their respective atomic weights has been of particular interest. This alloy, which corresponds to the chemical formula MnBi, contains about 20.8 per cent by weight of manganese. It possesses, especially when in a finely-divided state, extraordinarily high coercive force and residual magnetization which renders it extremely useful in the manufacture of permanent magnets.

Methods for the preparation of this alloy have been disclosed previously in the art. For example, the patent to Charles Guillaud, No. 2,576,679, granted November 27, 1951, describes the preparation of MnBi by melting together bismuth and manganese. Ingots of the resultant alloy, which contains only a fraction of MnBi, are subsequently annealed to favor the growth of large crystals of MnBi in the ingot. After annealing, the ingots are crushed extremely fine and the crushed material is subjected to a refinement by physical means. This refinement comprises a separation of particles of MnBi from other portions of the crushed ingot in which MnBi has failed to form. As taught in the aforementioned patent, selection may be done by magnetic means or by known processes utilizing density differences between particles of MnBi and other metallic portions of the ingot.

The present invention concerns a process for producing MnBi from a melt of manganese and bismuth with such a high degree of formation of alloy of the proper stoichiometric composition that separate steps for the separation of the MnBi from other portions of the cooled melt may be eliminated entirely. By dispensing with the necessity for such separation processes, considerable savings in time, equipment, effort and expense can be effected.

Conventional processes for cooling melts in which manganese and bismuth are present in amounts conducive to the formation of the alloy MnBi are non-equilibrium processes which lead to the formation of polyphase solids in which Mn, Bi, and MnBi can be detected. Because of the extreme slowness of diffusion, even the most lengthy cooling of the melt is such a non-equilibrium process. The amount and composition of the phases present is highly dependent on the non-equilibrium cooling conditions, but in general, a bismuth-rich phase, a manganese-rich phase and varying amounts of MnBi dispersed throughout these phases result from cooling such melts by techniques used in the prior art. Since molten manganese is less dense than molten bismuth, considerable physical segregation of the phases present usually occurs. Manganese-rich portions will often be found at the top of a casting, and high bismuth content material may be found at the bottom of the same ingot. If cooling is sufficiently slow, segregation of phases may be so pronounced as to be visible to the eye in an ingot.

In the process which is the subject of the present invention, a homogeneous melt is subjected to such rapid non-equilibrium cooling that phase segregation is largely inhibited. The resulting ingots are found to contain a high proportion of MnBi, between about 50 percent to 60 percent by weight. Most significantly, in such cooled material in which phase segregation has been suppressed by very rapid cooling, the remaining phases can be readily converted to MnBi by simple heating at a moderate temperature. By this heating, the content of MnBi in the metal can be readily raised to 95 percent by weight, or more. Such a high content of the desirable product, MnBi, eliminates the need for separation of the product from other phases present, and yet produces a magnetic material as high in MnBi content as that which would ordinarily be produced by using the additional complicating separation steps.

As mentioned, the new process permits dispensing with steps formerly required to win MnBi from solids in which it is dispersed with other materials, yet accomplishes this end by a simple heating. No equipment other than that already available in laboratories or foundries is required.

Further, by carrying out such heating to convert other phases in the ingot to MnBi while the material is held in an applied magnetic field, the MnBi can be substantially completely oriented.

As described in the aforementioned patent to Charles Guillaud and in the thesis "Ferromagnetism of Binary Alloys" by Charles Guillaud, submitted in March 1943 to the Faculty of Sciences of the University of Strasbourg, two processes are known in the prior art for preparing masses of oriented MnBi.

One method, which comprises the formation of MnBi in an orienting magnetic field by heating finely-powdered manganese and bismuth at 350° C., suffers from failure of the materials to react completely. Substantial amounts, 30 percent or greater, of unreacted materials dilute the oriented MnBi which is formed.

A second method for making oriented MnBi masses calls for preparation of an MnBi-containing solid from a mixture of manganese and bismuth, pulverization of the solid, separation and concentration of MnBi by removal of non-magnetic reaction products using the magnetic or density separations mentioned earlier, suspension of the essentially pure MnBi particles in a fluid medium such as paraffin or plastic, orientation of the suspended magnetic particles under the influence of an applied magnetic field, and then immobilization of the oriented particles by solidification of the fluid medium. Because the suspended magnetic particles must be free to rotate in the fluid medium under the influence of the applied field, the oriented bodies produced are not dense and have a relatively low content of magnetic MnBi.

By the methods of the present invention, which include quick-cooling of a manganese-bismuth melt and heat treatment of the solidified material in an applied magnetic field, dense bodies of MnBi having MnBi contents as high as 95 percent can be produced. Separation steps for concentrating the desired magnetic alloy are unnecessary, and fluid suspending media are not required. Randomly oriented MnBi present in the as-cast material is believed to reorient on heating in a magnetic field by a mechanism of recrystallization, without a rotation or physical movement of the crystals originally present. In addition, other portions of the as-cast material react to form MnBi on heating, which MnBi is oriented as formed by the influence of the applied magnetic field. In this manner a very high percentage of the as-cast metal can be converted to oriented MnBi without additional process steps.

Figure 1:
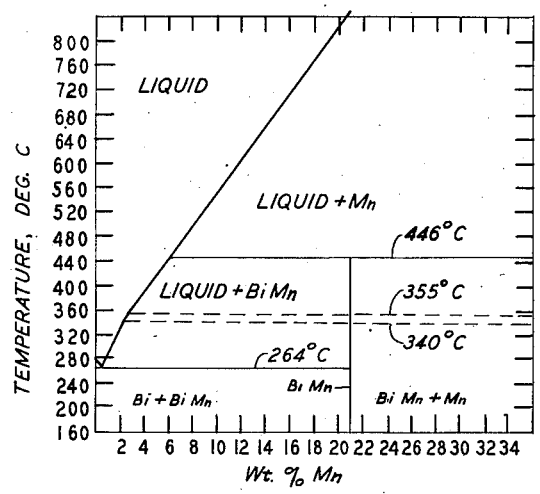
Fig. 1 is a reproduction of the equilibrium diagram of that part of the Mn-Bi system which is of present interest.

Fig. 1 is an equilibrium diagram of part of the MnBi system as reported by Seybolt, Hansen, Roberts and Yurcisin in the Journal of Metals, Transactions Section, volume 8, No. 5, May 1956, page 609. From the diagram it can be seen that the formation of MnBi, at 20.8 percent manganese, is by a peritectic reaction at a reported temperature of about 446° C. The liquidus for a composition containing the proportion of manganese is shown at 840° C. As can be seen from the diagram, there is a eutectic at about 264° C. for alloys of very low manganese content. The authors report a loss of ferromagnetic properties in BiMn at a temperature of about 355° C. on heating, with reappearance of ferromagnetism at a temperature of about 340° C. on cooling. These temperatures are indicated by the broken lines in the figure.

Figure 2:
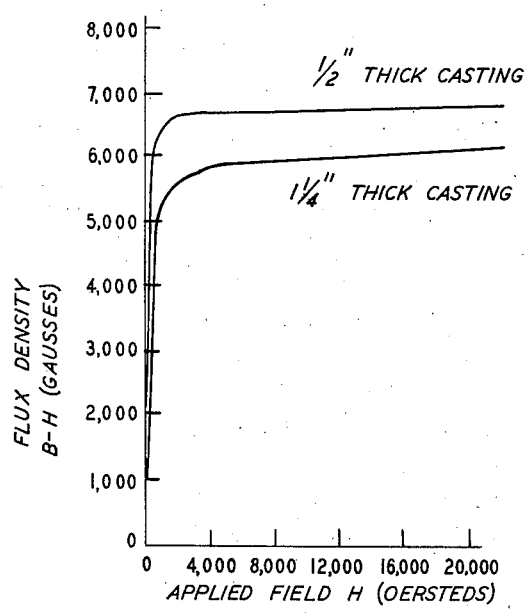
Fig. 2 is a graph comparing the intrinsic flux densities, as a function of field strength, of an 1¼ inch thick and an ½ inch thick ingot cast from a manganese-bismuth melt, which castings have been heat-treated in a magnetic field for six hours at 300° C.

In Fig. 2, the ordinate measures the flux density (B–H) in gausses of two quick-cooled castings of different thickness, plotted as a function of applied field in oersteds. Both samples, cut from ingots chill-cast in ½ inch and 1¼ inch thicknesses respectively, as noted, have been previously heat-treated for 6 hours at 300° C. in an atmosphere of nitrogen while in an applied field of about 10,000 oersteds.

The near horizontality of the curves at high applied fields indicates that both materials are essentially saturated. The difference in flux density observed for the two samples at a given value of the applied field is attributable to the presence of a greater amount of oriented MnBi in the ½ inch thick casting. This casting, cooled more rapidly from the melt than the thicker casting whose characteristics are pictured, before heat treatment had a physical structure more favorable to extensive formation of MnBi during heat treatment than did the thicker casting. The importance of rapid cooling to the efficient production of MnBi on heat treating is explained more fully later herein.

Figure 3:
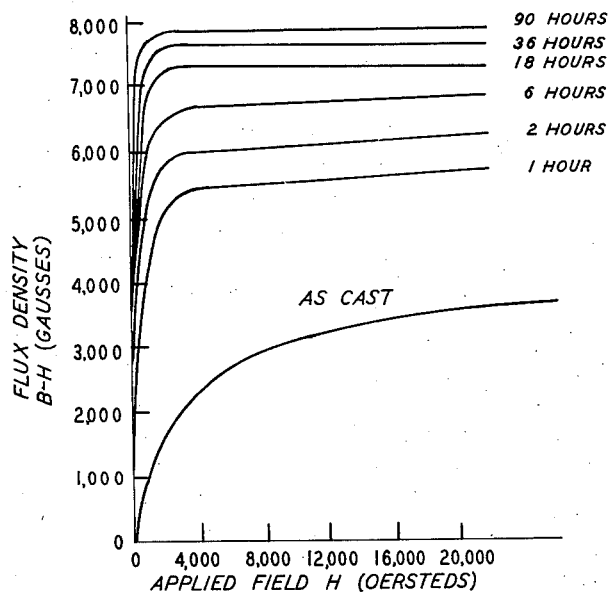
Fig. 3 is a graph comparing the intrinsic flux densities, as a function of field strength, of as-cast alloy material, quick-cooled as herein described, and similar alloys which have been heat-treated in a magnetic field for periods of time between one hour and 90 hours.

In Fig. 3, in a graph whose coordinates are again flux density (B–H) in gausses and applied field strength in oersteds, is shown the effect of heat treating bulk alloys containing MnBi. The treated alloys were formed from melts quick-cooled by the process of this invention, and have been heat-treated in a magnetic field of about 6000 oersteds at 300° C.

From the graph it is apparent that the as-cast quick-cooled alloy, not heat-treated in a field, is randomly oriented. Heat treating in a field for one hour raises the flux density and flattens the curve toward an asymptotic saturation value. More extended heat treatments increase this trend, and after a 6 hour treatment in a field the material has essentially reached saturation at a flux density value considerably above that of the as-cast material. Further heat treatment in a field will produce material of still higher saturation flux densities. The latter phenomenon indicates that heat treatment in a field results not only in the orientation of MnBi already present, but randomly oriented, in a quick-cooled alloy, but, further, results in the production of oriented MnBi in the sample being treated. Increases in flux density values above that of the as-cast material, brought about by heat treatment in a field, are then due both to orientation of randomly-oriented MnBi present in the as-cast alloy and to oriented MnBi generated in the casting by the heat treatment itself. This production of increasing quantities of MnBi can be substantiated by micrographs made of the alloy as treatment progresses.

Figure 4:
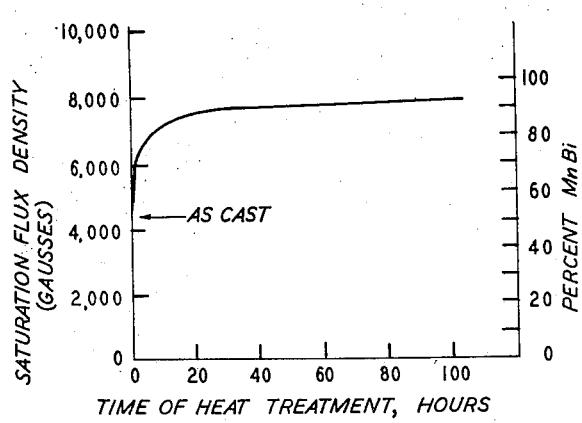
Fig. 4 is a graph in which the intrinsic flux density and percent by weight content of MnBi present in a quick-cooled casting are plotted against the time for which the material of the casting was heat-treated in a magnetic field.

In Fig. 4 estimated saturation values read from the curves shown in Fig. 3 have been plotted against the time of heat treatment in hours. The ordinate has been scaled both in gausses showing saturation magnetization and in the weight per cent of MnBi calculated to be present in the material on the basis of the observed saturation magnetization.

It is evident from the curve that continued heat treatment in a field, up to over 100 hours, will continue to produce oriented MnBi in alloy materials prepared as herein described. The curve shows also that as-cast material can be prepared with a calculated MnBi content between 50 percent and 60 percent by weight. Further, the effect of heat treatment can be seen to be most pronounced during the first few hours of such treatment.

In constructing the scale of percent MnBi converted, a value of 8500 gausses has been used as the saturation flux density of MnBi. This approximate value of the saturation flux density was calculated from the flux density value published, in centimeter-gram-second units, by R. R. Heickes in his article "Magnetic Transformation in MnBi," The Physical Review, volume 99, number 2, July 15, 1955 at page 446. The density (mass per unit volume) value used in converting units was derived from the lattice constants of MnBi published by Guillaud.

Figure 5:
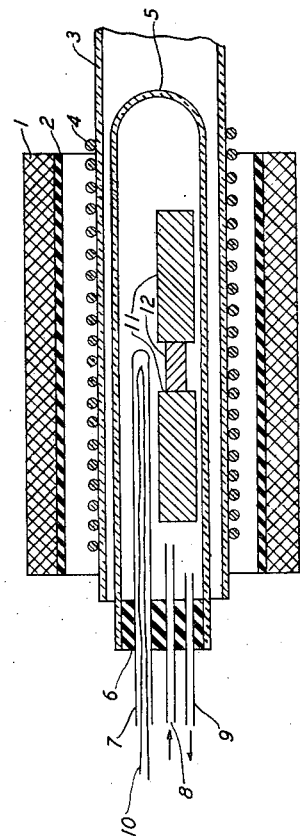
Fig. 5 is a side elevation, in section, of an apparatus in which heat-treatment in a magnetic field may be conveniently accomplished.

In Fig. 5 is shown, in section, a side view of an apparatus in which heat treatment of the alloys of the present invention can be carried out while holding the alloys in an orienting field. In Fig. 5, electrically conducting wire coil 1 wound around core 2, which may be of metal, forms an electromagnet. Within the magnet is tube 3, of a material such as glass, having electric heating coils 4 wound thereabout. Current passing through heating coils 4 heats sealed tube 5, also conveniently of glass, within tube 3. Tube 5 is sealed by stopper 6, which stopper is punctured by three tubes 7, 8, 9 passing into the interior of tube 5. Tube 7, sealed at one end, contains thermocouple 10, the hot junction of which measures the temperature within tube 5. Tubes 8 and 9 are respectively an inlet and outlet for an inert or reducing gas. An atmosphere of such a gas is kept within tube 5 during heating to prevent oxidation of the contents of the tube. Sample 12, the material to be heat treated, is placed in tube 5 in the protective atmosphere maintained therein. Blocks 11 of a magnetic material, such as iron, can be put next to sample 12, to increase the field in the vicinity of the sample 12.

In producing MnBi by the process described herein, the preparation of a melt which, when cooled, will contain manganese and bismuth in approximately equal atomic proportions is the first step. As noted, such an alloy will contain about 20.8 percent by weight of manganese. In preparing a melt which will cool to a solid alloy of this composition, an excess of manganese is generally employed. This excess, which will run about 1 percent to 5 percent by weight of the total weight of the melt, compensates for manganese lost by evaporation from the melt and manganese lost by oxidation of the melt surface. As noted earlier, manganese, being lighter than bismuth, tends to concentrate at the melt surface, affording opportunity for its loss by oxidation or evaporation. The extent of departure from the exact stoichiometry of MnBi, that is the quantity of excess manganese added, is best determined empirically since it is dependent on heating rate, crucible shape, furnace construction, and other variables affecting the area of melt surface exposed and the time for which it is exposed.

The melt may be prepared from the pure solid metals in any form, such as chunks, ingots or powders. For fusing the metals in preparing a melt, the use of an induction furnace is preferred. Though other types of furnaces are also satisfactory, the induction furnace has the additional advantage of agitating and homogenizing the melt. If means other than induction heating are used, mechanical stirring should be provided, since a thorough mixing of manganese and bismuth in the melt is highly desirable. Induction heating is preferred for melt preparation, since it eliminates the need for mechanical stirring.

In heating, a temperature above the liquidus temperature should be attained. Though the equilibrium diagram of Fig. 1 puts the liquidus temperature of 20.8 percent manganese compositions at about 840° C., earlier workers have reported the liquidus at a temperature as high as 1100° C. To assure that there are no solids present with the melt, it is convenient to heat the melt to about 1200° C., though temperatures down to 1000° C. may be used so long as the metal remains molten. At these temperatures, the melt is conveniently retained in fused silica crucibles.

The melt is kept at an elevated temperature long enough to bring about complete solution of any solids and to permit such stirring of the melt as will homogenize it. Though protective atmospheres of non-oxidizing gases can be kept over the melt, they are not necessary, particularly for small quantities of melt. A loose cover over the crucible being heated is conveniently used. As mentioned, a slight excess of manganese over the stoichiometric proportion in MnBi is added to compensate for manganese losses. After the melt is homogenized, it is cooled as rapidly as possible to a temperature below about 300° C. Below the eutectic temperature of about 264° C. the melt solidifies completely.

The rapid cooling of the melt is essential. By rapid cooling, it is sought to prevent substantial separation of the phases formed on cooling. Ideally, if equilibrium conditions could be approximated in cooling, a high proportion of MnBi would be produced. Because of segregation and the slowness of diffusion however, even slow cooling will be far from equilibrium cooling, and large proportions of phases other than MnBi will be present. By very rapid cooling of the melt, as here taught, the formation of a homogeneous matrix alloy is favored, in which matrix alloy any MnBi formed on cooling is embedded. In this matrix alloy manganese and bismuth are present in nearly equal atomic proportions. By subsequent low temperature heating of the quick-cooled ingot, this matrix material is readily converted to MnBi.

For rapid cooling of the melt from temperatures above the liquidus to temperatures below or near the eutectic temperature, chill casting techniques have proved highly advantageous. Such processes can be discontinuous and are also amenable to use in a continuous casting technique, known elsewhere in the art, by which ingots are formed by continuously feeding molten material from a reservoir to a chill zone from which zone previously solidified metal is simultaneously removed. Water and oil quenching techniques may also be suitable if oxidation of the melt by the quenching medium is prevented. Such conventional quenches usually produce particulate solids of high surface area. Unless the melt is cooled very rapidly, a high surface area may promote the sweating out of bismuth from the particle surface when the quenched material is still at a relative high temperature in the quenching process.

Non-continuous chill casting is conveniently done by pouring the melt into conventional molds having at least one narrow dimension. Steel molds giving castings about ½ inch thick, and of varying depth and width are particularly convenient. Such molds, by retaining a narrow dimension, permit rapid removal of heat from the ingot to the mold wall, thus giving rapid cooling of the cast alloy. If the ingot is made too thick, cooling may be excessively slow and phase segregation may result. If a very thin ingot is produced, phase segregation is inhibited, but other problems interpose themselves. For example, surface portions of an ingot tend to oxidize on cooling and are commonly removed to clean the ingot. In a very thin ingot, the ratio of surface area to volume is high and a considerable portion of the ingot mass may be lost by oxidation. Also, segregation of phases is most common at the surface, where bismuth is free to sweat out. Since phase segregation is desired to be kept at a minimum, the ingot surface is preferably also kept at a minimum consonant with rapid cooling.

The total heat capacity of the mold, and hence the rate at which it will cool a melt, are affected by the material of the mold and the mass of the mold. These variables will determine the range of acceptable ingot thickness in any given case. For steel molds, ingots up to 1¼ inches thick have been successfully cast. A thickness of about ½ inch is preferred when casting in steel. This thickness gives rapid cooling without excessive phase segregation.

For a ½ inch thick ingot, cast in a steel mold, cooling from a temperature of 1000° C. to a temperature of about 260° C. can be done in slightly less than two minutes, corresponding with an average cooling rate of about 325° C. per minute. A temperature of 445° C., at which MnBi can form from the melt, can be reached in about ½ minute. If the thickness of the ingot is increased to 1¼ inches, the rate of cooling drops. An ingot of this latter thickness may be cooled from about 1000° C. to about 260° C. in 16 minutes, or at an average rate of about 45° C. per minute. Cooling to 445° C. in such a sample takes about 2 minutes.

As can be seen from Fig. 2, the alloy cast as a ½ inch thick ingot shows a higher intensity of magnetization than the alloy cast as a 1¼ inch ingot after comparable heat treatment in a field. This difference is due mainly to a greater conversion of matrix alloy to MnBi in subsequent heat treatment because of only limited phase segregation in the ingot during the more rapid cooling. This is not to deprecate the material of the thicker casting which, nevertheless, contains substantial initial quantities of MnBi and can be treated to convert large fractions of matrix alloy to MnBi by heating. But to favor an efficient conversion of matrix alloy to MnBi by later heat treatment, the most rapid cooling is preferred.

Average rates of cooling, between the temperatures of about 1000° C. and about 250° C., of at least about 300° C. per minute are preferred. Average cooling rates, in the same temperature range, of at least about 50° C. per minute will give a satisfactory casting.

The use of water-cooled copper molds raises the cooling rate to very high values, and permits the casting of ingots thicker than those found best for uncooled steel molds. Crucible cooling, which may require an hour or more to bring about a temperature drop from 1000° C. to about 250° C. is entirely unsatisfactory. The phase segregation occurring during such an extended cooling period is so extensive as to be visible to the naked eye.

Micrographs of quick-cooled ingots show considerable quantities of MnBi, the magnetic domain patterns of which become visible under polarized light. Surrounding the MnBi crystals is a matrix, probably consisting of a solid solution of bismuth and manganese, or of manganese finely dispersed in bismuth. A third material, believed to be manganese, is found in small quantities precipitated in the matrix. By heating, substantial amounts of the matrix and the precipitated matrix therein can be converted to MnBi.

MnBi in the quick-cooled casting is probably formed from those portions of the melt which have the proper unitary ratio of manganese atoms to bismuth atoms. Portions of the matrix surrounding this initially-formed MnBi must have compositions extremely close to that of MnBi. As can be seen from Fig. 4, conversion of the matrix alloy to MnBi takes place most rapidly in the initial period of heating, falling off in rate with time. Such behavior is consistent with conversion of the matrix in a pattern spreading from an initial nucleus of MnBi. Those portions of the matrix which are most similar in chemical composition to MnBi will be most easily converted. Portions of the matrix most different in composition from MnBi will convert more slowly, due to the time required for diffusion of atoms needed to correct the imbalance in composition.

Conversion of the cast ingot by heating is done at temperatures between about 250° C. and 445° C. As MnBi does not exist above about 445° C., heating should not exceed this temperature. Below about 250° C., the rate of conversion of matrix to MnBi is infeasibly slow. Heating the cast alloy tends to sweat bismuth from the alloy. The amount of sweating increases with temperature, so heating is preferably done at as low a temperature as gives a good conversion rate. Thus, a temperature in the range between 260° C. and 350° C., or between 260° C. and 300° C. is preferred. At 300° C. conversion is rapid. At higher temperature conversion is still more rapid, but sweating of a liquid containing about 95 to 99 percent bismuth may be noticeable. A temperature of about 275° C. gives both a rapid conversion and keeps sweating of the alloy down.

The longer the period during which the material is heated, the greater will be the total quantity of matrix finally converted to MnBi. Though for even those castings showing the highest initial MnBi content, measurable conversion may still occur after as long as ninety hours of heating, most conversion takes place within the first 24 or 36 hours of heating for heating temperatures in the ranges given above. For most purposes a sufficiently high MnBi content in an alloy can be reached by heating for only 24 hours. Even shorter periods of heating, up to 6 hours, or 12 hours, may convert enough matrix alloy to MnBi, which, with the MnBi present as cast, will yield a useful product. The higher the temperature at which the alloy is heated, the shorter is the time required to convert a given portion of the alloy to MnBi.

When heating the alloy for periods as long as those contemplated above, a protective atmosphere or vacuum should be kept over the alloy to prevent undue oxidation. Either reducing gases, such as hydrogen, or inert gases, such as nitrogen, argon, or helium can be used for the atmosphere. At the low temperatures at which the alloy is heated, there is little reduction of already oxidized portions of the ingot. Inert gases are thus as satisfactory as reducing gases for the furnace atmosphere, since only further oxidation is sought to be prevented.

As mentioned earlier herein, by heating the as-cast material while it is in a magnetic field the grains of MnBi in the material can be oriented to lie with their direction of easy magnetization in the direction of the applied magnetic field. Since MnBi loses ferromagnetic properties at a temperature of about 355° C., as noted in Fig. 1, if alignment is sought during heat treating, such heat treatment should be carried out at or below a temperature of about 350° C. The direction of easy magnetization in MnBi is along the hexagonal, or c axis of the crystal.

While some reorientation in a magnetic field is observed also for material previously converted by heat treatment to have a high content of randomly-oriented MnBi, the efficiency of orientation in a field is increased strikingly by subjection of the alloy to an orienting field when there is still a substantial quantity of the matrix portion of the alloy unconverted to MnBi.

The difference in the amount of orientation possible in the two situations described above is believed due to a greater ease of reorientation of MnBi already present in the material under treatment when some matrix is also still present. Possibly reorientation is due to a physical realignment of MnBi grains already crystallized before heat treatment, facilitated by the appearance of a molten, bismuth-rich material which may be present when the alloy is heated to temperatures above about 260° C. As noted, the eutectic temperature is reported at about 260° C., and it is in the temperature range above about 260° C. that conversion begins to proceed with relative ease.

However, it has been also hypothesized that reorientation of MnBi present in the material before heat treatment may proceed by recrystallization of these randomly-oriented crystals. This recrystallization of randomly-oriented MnBi present in the material before heat treatment may be proceeding by mechanisms involving strain, or absorption of the randomly-oriented material by adjacent crystals of properly-oriented MnBi, or by a selective solution of randomly-oriented particles with redeposition on crystals of MnBi properly oriented in the imposed field. The latter oriented MnBi may be portions of randomly-oriented material originally present which are, by accident, properly aligned in the applied magnetic field. Also, such properly-oriented MnBi is that formed from the matrix alloy while heat treatment in the field progresses. Such MnBi crystallizes initially with its direction of easy magnetization in the direction of a strong applied field.

The strength of such orienting magnetic fields should be as high as possible to bring about orientation in a short space of time. For the as-cast, quick-cooled, ingots described herein, substantial orientation has been observed after 24 hours of application of a field of 2500 oersteds during heat treatment. Perceptibly complete orientation can be brought about in the same time by heating in a field of 6000 oersteds. If field strengths of at least 10,000 oersteds are used, the time of treatment can be reduced to about 18 hours or less, with essentially complete orientation taking place. In general, a field of at least 2000 oersteds will accomplish some orientation, a field of at least 5000 oersteds will produce much more rapid orientation, and an applied magnetic field of at least 10,000 oersteds is preferred. With these field strengths, orientation can generally be accomplished by heating as-cast material in the field for times between 6 hours and 24 hours. Stronger or weaker fields will require less or greater exposure to the field, respectively, to bring about the same results. For a given material as cast, a sufficiently strong orienting field should preferably be used as will bring about substantially complete orientation in at least that time of heating used to convert the as-cast material to MnBi. Orientation of substantially all MnBi present in an alloy is preferred.

If heat treatment has been given the alloy before orientation is attempted, stronger fields and longer exposures to the fields are required to bring about orientation. As mentioned earlier, orientation is easiest in the presence of unconverted matrix alloy. If the matrix alloy is converted to MnBi by heating without simultaneous orientation, a later orientation and heat treatment may require longer times and higher applied fields than would be used on as-cast material.

Though the conversion of the matrix portion of an as-cast alloy to MnBi is conveniently done on the ingot in bulk form, such conversion may also be carried out on the material of the ingot after subdivision of the ingot. Such conversion of subdivided ingot material to material containing a higher content of MnBi under the influence of heat may also be done in an orienting field, as for the bulk ingot. For example, a casting may be reduced to finely-divided powder, shaped into a body by hot or cold pressing, within or without an orienting magnetic field, and then may be subjected to heat treatment between 250° C. and 350° C. for conversion of matrix alloy to MnBi while in an orienting magnetic field for alignment of MnBi present.

The production of an oriented MnBi sample by quick-cooling and heat treatment in a field is described in detail in the following example.

*Example*

450 grams of cathode-strip electrolytic manganese and 1550 grams of bismuth, both in chunk form, were placed in a fused silica crucible. Both metals had a purity exceeding 99.9 percent. The crucible was then heated in a commercial high frequency coreless induction furnace using a frequency of 3 kilocycles. The 2000 gram charge, containing 22.5 percent by weight of manganese and 77.5 percent by weight of bismuth, was liquefied and heated to 1200° C. in about 10 minutes. A loose fitting cover was kept over the crucible during the heating. After reaching temperature, the melt was immediately poured into steel molds about ½ inch thick, about 2½ inches wide, and about 10 inches deep. With a wall thickness of about 7/16 inch, the molds gave an approximate average cooling rate of 350° C. per minute in the temperature range between 1000° C. and about 250° C. After the cast ingot had cooled, a test sample ⅜ inch by ⅜ inch by ½ inch was cut from the centermost portion of the ingot. The sample was heated in a stream of nitrogen for 18 hours at 300° C. in an applied magnetic field of about 6000 oersteds. The sample after this treatment, had a saturation magnetization (B–H) of 7300 gausses, as shown in Fig. 3.

Although specific embodiments have been shown and described, it is to be understood that they are merely illustrative, and should not be construed as limiting the scope and spirit of the invention.

What is claimed is:

1. The process of preparing MnBi from a molten mass containing manganese and bismuth in proportions such as to yield, upon freezing, a solid in which the ratio of the number of gram atoms of manganese to the number of gram atoms of bismuth present is approximately unity, which process comprises solidifying said molten mass sufficiently rapidly to prevent substantail phase segregation, and then heating the solidified material at a temperature between about 250° C. and about 445° C. until the material has been substantially completely converted to MnBi.

2. The process of preparing MnBi from a molten mass containing manganese and bismuth in proportions such as to yield, upon freezing, a solid in which the ratio of the number of gram atoms of manganese to the number of gram atoms of bismuth present is approximately unity, which process comprises solidifying said molten mass sufficiently rapidly to prevent substantial phase segregation, and then heating the solidified material at a temperature between about 250° C. and about 350° C. in an applied magnetic field until the material has been substantially completely converted to MnBi.

3. The process of preparing MnBi from a molten mass containing manganese and bismuth in proportions such as to yield, upon freezing, a solid in which the ratio of the number of gram atoms of manganese to the number of gram atoms of bismuth present is approximately unity, which process comprises air quenching said molten mass as rapidly as possible to prevent substantial phase segregation and then heating the solidified material at a temperature between about 260° C. and about 350° C. until the material has been substantially completely converted to MnBi.

4. The process as described in claim 3 for which, during said heating, a magnetic field of at least 2000 oersteds is applied to said solidified material to orient the MnBi present.

5. The process of preparing MnBi from a molten mass containing manganese and bismuth in proportions such as to yield, upon freezing, a solid in which the ratio of the number of gram atoms of manganese to the number of gram atoms of bismuth present is approximately unity, which process comprises slodifying said molten mass at an average cooling rate, between a temperature of about 1000° C. and a temperature of about 250° C., of at least 50° C. per minute, and then heating the solidified material at a temperature between about 260° C. and 350° C. for at least 24 hours.

6. The process as described in claim 5 for which said solidified material, during said heating, is subjected to an applied magnetic field of at least 2000 oersteds to orient the MnBi present.

7. The process of preparing MnBi from a molten mass containing manganese and bismuth in proportions such as to yield, upon freezing, a solid in which the ratio of the number of gram atoms of manganese to the number of gram atoms of bismuth present is approximately unity, which process comprises solidifying said molten mass by chill-casting to prevent substantial phase segregation, and then heating the solidified material at a temperature between about 260° C. and about 350° C. until the material has been substantially completely converted to MnBi.

8. The process as described in claim 7 for which chill-casting is done by casting the melt into metal molds to form an ingot which is about ½ inch in at least one dimension.

9. The process as described in claim 7 for which, during said heating, a magnetic field of at least 2000 oersteds is applied to said solidified material to orient the MnBi present.

References Cited in the file of this patent

UNITED STATES PATENTS 2,576,679    Guilland _____ Nov. 27, 1951